United States Patent [19]

Hensel et al.

[11] 4,290,647
[45] Sep. 22, 1981

[54] HINGE MOUNT ASSEMBLY FOR RECLINABLE SEAT

[75] Inventors: Wolfgang Hensel, Langenfeld; Hans-Joachim Berghof; Heinz Werner, both of Remscheid, all of Fed. Rep. of Germany

[73] Assignee: Keiper Automobiltechnik GmbH & Co. K.G., Remscheid, Fed. Rep. of Germany

[21] Appl. No.: 81,447

[22] Filed: Oct. 3, 1979

[30] Foreign Application Priority Data

Oct. 13, 1978 [DE] Fed. Rep. of Germany ... 7830544[U]

[51] Int. Cl.³ ............................................. A47C 1/025
[52] U.S. Cl. .................................... 297/362; 297/354
[58] Field of Search ....................... 297/362, 366–369, 297/354, 355

[56] References Cited

U.S. PATENT DOCUMENTS

| | | | |
|---|---|---|---|
| 3,641,838 | 2/1972 | Turner | 297/369 X |
| 3,663,056 | 5/1972 | Turner | 297/369 |
| 3,926,474 | 12/1975 | Johndrow et al. | 297/367 X |
| 4,020,717 | 5/1977 | Johnson | 297/362 X |
| 4,195,884 | 4/1980 | Muhr et al. | 297/362 |

*Primary Examiner*—William E. Lyddane
*Attorney, Agent, or Firm*—Michael J. Striker

[57] ABSTRACT

A hinge mount assembly for motor vehicle seats includes at each lateral side of the seat an outer hinge mount member shaped with an embossed external gear meshing at one point with the internal gear. Both hinge mount members are supported on a rotary axle having an eccentric portion supporting the inner hinge mount member and thus forming a wobble gear inclination adjuster for the backrest. The axial compactness of both hinge mount assemblies of the seat is insured by bearing plates adjoining the inner hinge mount members and being interconnected above the pivot axle by a U-shaped attachment frame for the backrest and, below the pivot axle, by a transverse beam. In addition, each inner hinge mount member is rigidly connected to a reinforcing side strap which overlaps the outer surface of the outer hinge mount member.

7 Claims, 6 Drawing Figures

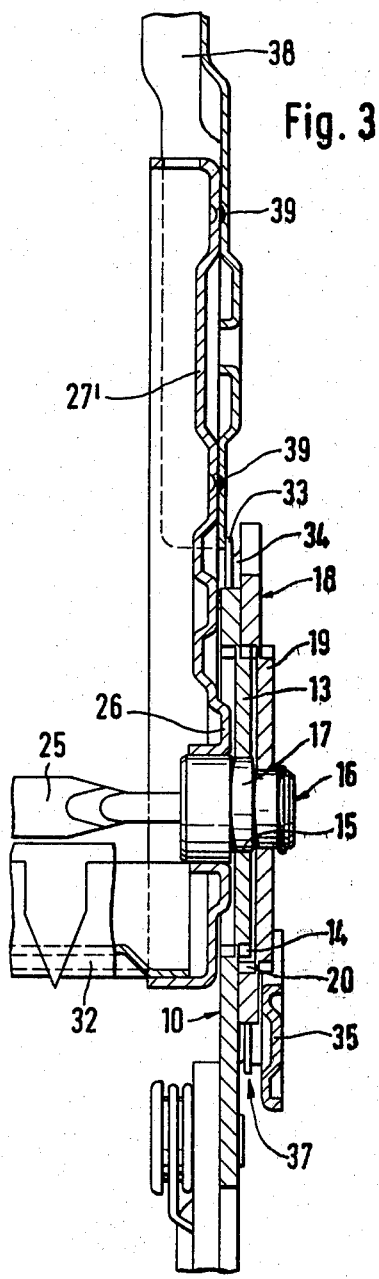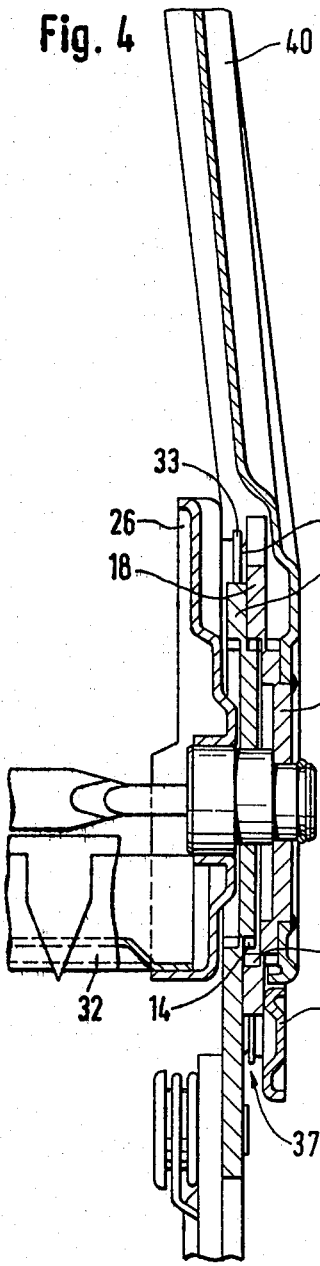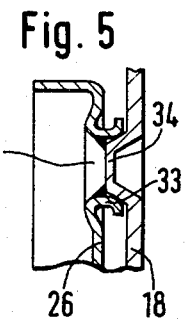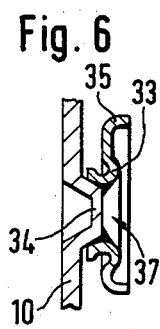

HINGE MOUNT ASSEMBLY FOR RECLINABLE SEAT

BACKGROUND OF THE INVENTION

This invention relates generally to seats having reclinable backrests, and more particularly it relates to a hinge mount assembly for motor vehicle seats wherein a fixed hinge mount is arranged at each lateral side of the seat component and a tiltable hinge mount is arranged to corresponding sides of the backrest. The two hinge mounts are coupled by a pivot axle whereby the mutual position of the two mounts is adjusted and arrested by means of wobble gears formed on or connected to the respective hinge mounts and being supported on the pivot axle in such a manner that one wobble gear is supported on an eccentric portion of the axle and the other wobble gear on a concentric section; each hinge mount together with the wobble gears are held together in axial direction by a bearing plate which is supported on another concentric section of the pivot axle and encloses together with an outer hinge mount, the inner hinge mount.

In conventional hinge mount assemblies of the abovedescribed type the bearing plate either does not overlap the end opening for the pivot axle at all or, if it does, it does so only insubstantially. Each hinge mount member is formed with an attachment arm for connection to the backrest or to the seat component. Since the thickness of the end portion defining the pivot opening of respective hinge mount members cannot be selected below a certain value determined by the desired strength of teeth of the wobble gear assembly and of the bearings supported on the pivot axle, each attachment arm of respective hinge mount members must have a corresponding wall thickness which meets the requirements of particular fastening conditions. In addition, the attachment arms of conventional hinge mounts are made of the same high quality material as that used for the hardened teeth in the pivot openings of the connecting ends of the hinge mount and consequently the manufacturing costs of the seat are increased.

SUMMARY OF THE INVENTION

It is, therefore, a general object of the present invention to overcome the aforementioned disadvantages.

More particularly, it is an object of the invention to provide an improved hinge mount assembly of the aforedescribed type in which the size of respective hinge mount members corresponds substantially to the range of the hinge joint and consequently the selection of materials can be made primarily according to the requirement for the strength of teeth of the wobble gears.

Another object of this invention is to provide an improved hinge mount assembly which insures a reliable connection between the hinged mount members and a secure attachment of the latter to the seat and backrest components.

In keeping with these objects, and others which will become apparent hereafter, one feature of the invention resides, in the hinge mount assembly for seats having a seat component and a reclinable backrest component, in the provision of fixed mount members secured, respectively, to lateral sides of the seat component, tiltable hinge mount members secured, respectively, to the sides of the backrest component, a transverse pivot axle having at each end thereof two concentric portions and an intermediate eccentric portion, the eccentric portion supporting one of the hinge members and one of the concentric portions supporting the other hinge mount member, a cushion attachment frame secured to the other hinge mount member, a position adjuster in the form of wobble gears formed on respective hinge mount members, and a bearing plate supported on the other concentric portion of the pivot axle and being connected to the attachment frame.

In this manner, it is possible to use high quality materials only for those parts of the hinge mount assembly which cover the area of the hinge joint proper and at least one of the hinge mount members can be made without the usual attachment arm. Instead, the bearing plate which insures the axial compactness of the hinge mount assembly is modified to serve for fastening the backrest on the seat component. In this manner it is possible to reduce substantially the thickness of the wall of the bearing plate relative to that of the hinge mount members while it is possible to achieve sufficient lateral rigidity for example by stamping reinforcing bosses or ribs in the wall of the bearing plate. For increasing the stability of the assembly it is of advantage when, according to another feature of the invention, the bearing plates on either side of the seat are interconnected by means of a transverse beam.

In the preferred embodiment of this invention, the bearing plates are arranged on the inner side of the hinge mount assembly and are connected with the outer hinge mount member to enclose the inner hinge mount member and each outer hinge mount member is connected to the attachment frame for holding cushions of one of the seat components. In this manner, the conventional attachment arm of the hinge mount member assigned to the backrest is replaced by the bearing plate and due to the fact that the attachment frame covers the hinge mount assembly from the outside, the attachment covering means for the backrest is made possible even in the area of the hinge joint since the edges of the latter are covered on the outer side.

Further saving of material can be achieved when according to still another feature of this invention the bearing plates for both hinge mounts on the vehicle seat are formed by end portions of a U-shaped cushion attachment frame. Preferably, these end portions are formed with the bearing openings on juxtaposed sides of respective mounts and are secured to the outer hinge mount members whereby the interspace is occupied by the inner hinge mount member which is connected to the seat component. By unifying the two bearing plates in a single attachment frame for a backrest cushion for example, which frame is connected to both hinge mounts at respective lateral sides of the seat component, these result considerable advantages both from the manufacturing point of view as well as for the assembly of the seat. These advantages result particularly from the fact that the attachment frame can be made by a stamping or pressing process for increasing the stability and of a material which can be selected without any consideration for the strength of the teeth of the wobble gear assembly. At the same time, upon securing the bearing plates in position in the hinge mount assembly the attachment frame is positively placed in position on the hinge mount.

In order to maintain a stable axial position of the hinge mount members also in their lower range where the attachment arm for the seat component is located, the inner hinge member, according to still another feature of this invention, is provided with a holding side strap which partially overlaps the outer surface of the outer hinge mount member.

A simple connection of the bearing plates to the assigned hinge mount members on the one hand and of the holding side bars to the assigned hinge mounts on the other hand, is achieved according to still another feature of the invention by forming the bearing plates and the holding strap with impressed collar bushings which engage conical or pin-like bosses shaped in the assigned hinge mount member and these collar bushings are connected to the conical bosses by welding.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 3 is a sectional elevation view of a modification of a hinge mount assembly of FIG. 2, in which bearing plates are connected to the backrest frame by welding;

FIG. 4 is a sectional elevation view of still another modification of a hinge mount assembly of FIG. 2 in which bearing plates are connected to the outer hinge mount member which in turn is connected to the backrest frame by welding;

FIG. 5 is a detailed sectional view of a connection point between a bearing plate and a hinge mount member, taken along the line V—V of FIG. 1 and shown on an enlarged scale; and FIG. 6 is a sectional enlarged view of a connection point between a holding side strap and a hinge mount member taken along the line VI—VI of FIG. 1.

DESCRIPTION OF THE PREFERRED EMBODIMENTS

Figure 1:
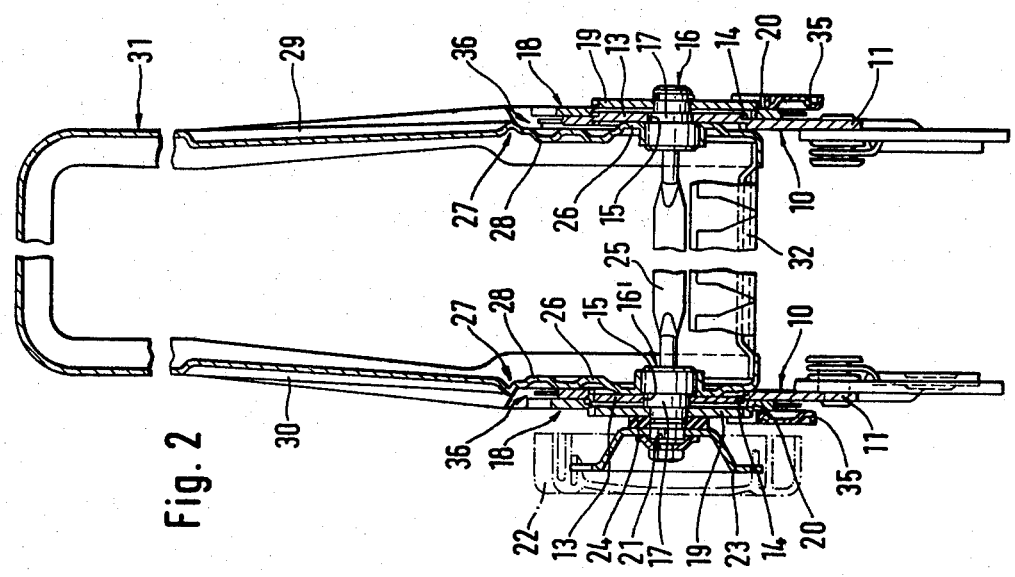
FIG. 1 is a side view from the interior of a vehicle seat of a hinge mount assembly of this invention.

In the examples of embodiments as illustrated in the drawings the construction of the hinge mount assembly at one lateral side of the vehicle seat corresponds to that at the other side of the seat. Each hinge mount assembly includes a hinge mount member 10 assigned to the seat component and having an attachment arm 11 for fastening this mount to a lateral side of the seat component. In the example as illustrated in FIG. 1, the free end of the attachment arm 11 is pivotably mounted to the seat component and is held in position thereon by a releasable pawl or latch 12 which engages a tubular component of the seat frame. The hinge mount member 10 in the range of the hinge joint proper is formed with an embossed spur gear 13 which is provided with the outer teeth 14 and further has a bore 15 which is concentric with the outer teeth 14 and encloses an eccentric portion 17 of a pivot axle 16 or 16'. Immediately adjoining the eccentric portion 17 are concentric portions, the outer of which supports the outer hinge mount member 18 which also has an embossed portion 19 forming an internal gear 20 which at one point is in mesh with the external teeth 14 of the other hinge member. The number of teeth of the external gear 14 is at least about one tooth less than the number of internal teeth 20 and the diameter of the crown circle of the external gear 14 is smaller than the diameter of the root circle of the internal gear 20 at least about the height of one tooth. The eccentricity of the eccentric portion 17 of the axle 16 relative to the lateral concentric portion of the axle is such that the external gear 14 of the hinge member 10 is permanently in mesh at one point with the internal gear 20 of the hinge member 18. This arrangement forms the wobble gear assembly for adjusting and arresting the angular position between the two hinge members 10 and 18 and thus between the seat component and the backrest component. The pivot axle 16' at the other lateral side of the seat differs from the pivot axle 16 at the inner side by an outwardly projecting spare pin 21 to which a handle 22 is firmly connected via an attachment cup-shaped piece 23. Between the piece 23 and the embossed area 19 of the hinge member 18 which is supported on the eccentric 17, there is arranged an elastic disc 24. The tensioning force resulting from the elasticity of the disk 24 prevents any rotation of the hinge member 18 relative to the pivot axle 16 or 16' which might otherwise occur in small increments due to vibrations of an unloaded seat. Both pivot axles 16 and 16' are interconnected for joint rotation by a coupling pipe 25 and consequently by rotating the pivot axle 16' by means of the handle 22, the other pivot axle 16 rotates simultaneously in the same direction and about the same angle. By turning the handle 22 the engagement point of both internal gears 20 on respective outer hinge mount members 18 with the external gears 14 of the inner mount members 10 moves due to the eccentricity of the section 17 relative to the concentric section of the pivot axle 16, along the periphery of the internal gear 20 and consequently the outer hinge mount members 18 upon the completion of one rotation of pivot axles 16 and 16' are angularly displaced relative to the seat hinge mount 10 about the pitch of one tooth. It will be noted that in the case of a larger difference between the number of teeth in the external and internal gears 20 and 14 the tiltable outer hinge mount 18 is angularly displaced about a correspondingly increased angle during each rotation of the axles 16 and 16'.

Figure 2:
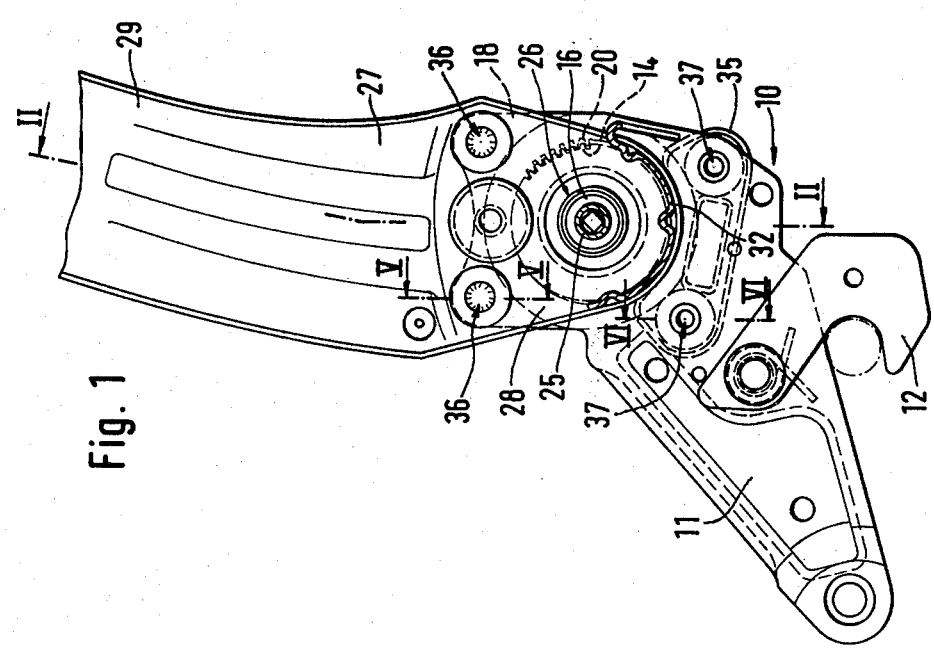
FIG. 2 shows a sectional elevation view of two hinge mount assemblies arranged at lateral sides of a vehicle seat and having bearing plates formed integrally with an attachment frame for the backrest component, taken along the line II—II of FIG. 1.

According to this invention, each outer hinge mount member 18 on respective lateral sides of the seat component is rigidly connected to a bearing plate 26 which is supported on the internal concentric section of the pivot axle 16 or 16'. In the embodiment as shown in FIGS. 1 and 2, the bearing plates 26 in each hinge mount assembly are integrally formed in the end portions of a U-shaped attachment frame 27 for holding a cushion of the backrest. Preferably, both bearing plates 26 are located at the inner wall of each hinge mount and each is connected with the assigned outer hinge mount member 18 in such a manner that an interspace which is formed between the bearing plate 26 and the outer mount member 18, is occupied by the inner mount member 10.

In the embodiment as illustrated in FIG. 2, the bearing plates 26 in both lateral hinge mount assemblies are formed by the end portions 28 of arms 29 and 30 of the U-shaped frame 31 which serves for the attachment of the cushion of the backrest. Both bearing plates are interconnected by a transverse beam 32 which is secured to the stamped out arms of the end portions 28 by welding for example, and in this manner a closed reinforced frame is created. As seen from FIGS. 2 and 5, two connection points 36 between the bearing plate 26 and the outer hinge mount member 18 are located above the pivot axle 16 or 16'. These connection points as illustrated on an enlarged scale in FIG. 5 are formed as a stamped-out collar bushing 33 on the bearing plate 26 and a matching embossed cone 34 on the outer hinge mount member 18 is inserted into the bushing 33 and firmly connected thereto by welding, for example.

To complete the axial compactness of each hinge mount assembly there are provided below the pivot axles 16 and 16' holding side straps 35 which at one end are rigidly connected to the inner hinge mount member 10 and overlap the edge of the outer hinge mount member 18 so that the latter is movable between the strap 35 and the inner member 10. Each holding side strap 35 is connected to the assigned hinge mount member by connection points 37 formed similarly as the connection points 36 between the bearing plate and the outer mount member 18. More specifically, each holding strap 35 has two collar bushings 33 spaced apart from one another which receive corresponding embossed cones 34 formed in the inner hinge mount member 10 (FIG. 6). The component parts of these connection points 37 are also rigidly connected one to another by welding. The distance between the facing surfaces of the inner hinge member 10 and the side strap 35 corresponds substantially to the thickness of the wall of the outer hinge member 18.

In the embodiment as illustrated in FIG. 3 showing a hinge mount assembly assigned to the right-hand side of the seat, the design substantially corresponds to the aforedescribed example. The only difference is in the arrangement of the attachment frame 38 which is not formed integrally with the bearing plate 26 but instead each bearing plate is stamped out as a separate piece including an extended frame mounting portion 27' which extends about a certain distance above the hinge mount assembly proper. The U-shaped attachment frame 38 has its free arms secured both to the outer hinge mount member 18 and at connection point 39 to the extended frame attachment portion 27' of the bearing plates 26 so that a union between the bearing plates 26, the frame 38 and the transverse beam 32 is established.

In the embodiment according to FIG. 4 hinge bearing plate 26 is similarly as in the example of FIG. 3 formed independently from the backrest frame 40 and has an extended upper portion which slightly exceeds the hinge mount assembly. The U-shaped attachment frame 40 for the backrest is connected at its end directly to the embossed part 19 of the outer hinge mount member 18, for example by welding, and the extended part of the bearing plate 26 is secured to the frame 40 at connection points formed of embossed collar bushings 33 in the bearing plate and engaging a fitting embossed cone 34 similarly as illustrated in FIG. 5.

It will be understood that each of the elements described above, or two or more together, may also find a useful application in other types of constructions differing from the types described above.

For instance, it is possible to employ a mounting frame for the seat component instead of for the backrest. In this case, the attachment shoulder or arm 11 of the inner hinge mount member 10 could be dispensed with and a bearing plate 26 could be connected to the member 10 in such a manner as to form therewith a frame for the seat component. Alternatively, it is possible to create both a mounting frame for the backrest as well as a mounting frame for the seat component when as described before the bearing plate for the backrest is extended upwardly and the holding side straps are extended into the form of a seat supporting frame.

While the invention has been illustrated and described as embodied in a hinge mount assembly, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. A hinge mount assembly for seats, particularly motor vehicle seats having a seat component and a reclinable backrest component, comprising a fixed hinge mount member secured to a lateral side of the seat component; a tiltable hinge mount member secured to the backrest component; a transverse pivot axle defining an intermediate eccentric portion and lateral concentric portions, said eccentric portion bearing on the fixed hinge mount member and one of said concentric portions supporting the tiltable hinge mount member, an attachment frame for the backrest component secured to said tiltable hinge mount member; a position adjuster including an outer gear formed on said fixed hinge mount member and an inner gear formed on said tiltable hinge mount member, said inner gear exceeding in diameter said outer gear and being in mesh therewith; and a bearing plate supported on the other concentric portion of the pivot axle and being connected to said attachment frame.

2. A hinge mount assembly as defined in claim 1, wherein the bearing plates assigned to respective tiltable hinge mount members at the two lateral sides of the seat component are interconnected by a transverse beam.

3. A hinge mount assembly as defined in claim 1, wherein said bearing plate has a projecting part exceeding the boundary of the adjoining fixed hinge mount member, said attachment frame being connected to said tiltable hinge mount member and to the projecting part of said bearing plate.

4. A hinge mount assembly as defined in claim 1, wherein said attachment frame has a U-shaped configuration and said bearing plates being integrally formed in the end portions of the arms of said frame.

5. A hinge mount assembly as defined in claim 4, wherein said bearing plates formed on said attachment frame adjoin, respectively, said fixed hinge mount member on each lateral side of the seat component and are rigidly connected to said tiltable hinge mount member above said pivot axle to form an interspace occupied by said fixed hinge mount member.

6. A hinge mount assembly as defined in claim 1, wherein said fixed hinge mount member is rigidly connected to a holding side strap which overlaps the outer surface of said tiltable hinge mount member below said pivot axle.

7. A hinge mount assembly as defined in claim 6, wherein said bearing plates and said holding straps are formed with embossed collar bushings and the corresponding hinge mount members are formed with fitting embossed cones engaging said bushings to provide connection points secured together by welding.

* * * * *